(12) United States Patent
Heilig

(10) Patent No.: US 10,313,372 B2
(45) Date of Patent: Jun. 4, 2019

(54) IDENTIFYING MALWARE-INFECTED NETWORK DEVICES THROUGH TRAFFIC MONITORING

(71) Applicant: David Paul Heilig, Lancaster, PA (US)

(72) Inventor: David Paul Heilig, Lancaster, PA (US)

( * ) Notice: Subject to any disclaimer, the term of this patent is extended or adjusted under 35 U.S.C. 154(b) by 186 days.

(21) Appl. No.: 14/635,761

(22) Filed: Mar. 2, 2015

(65) Prior Publication Data

US 2016/0261611 A1 Sep. 8, 2016

(51) Int. Cl.
*H04L 29/06* (2006.01)
(52) U.S. Cl.
CPC .................. *H04L 63/1425* (2013.01)
(58) Field of Classification Search
CPC ............. H04L 63/145; H04L 63/0227; H04L 63/1425
See application file for complete search history.

(56) References Cited

U.S. PATENT DOCUMENTS

| | | | | |
|---|---|---|---|---|
| 5,943,604 A * | 8/1999 | Chen | ........... | H04B 3/38 |
| | | | | 348/193 |
| 6,032,019 A * | 2/2000 | Chen | ........... | H04B 3/38 |
| | | | | 348/193 |
| 6,424,627 B1 * | 7/2002 | Sørhaug | ........... | H04L 43/00 |
| | | | | 370/241 |
| 8,181,249 B2 * | 5/2012 | Chow | ........... | G06F 21/566 |
| | | | | 713/187 |
| 8,274,979 B2 * | 9/2012 | Bragagnini | ........... | H04L 29/12009 |
| | | | | 370/392 |
| 8,516,586 B1 * | 8/2013 | Jensen | ........... | H04L 63/1425 |
| | | | | 713/153 |
| 8,578,491 B2 * | 11/2013 | McNamee | ........... | H04L 63/1408 |
| | | | | 709/223 |
| 8,954,957 B2 * | 2/2015 | Wu | ........... | H04L 12/4625 |
| | | | | 370/417 |
| 2004/0117478 A1 * | 6/2004 | Triulzi | ........... | H04L 63/1416 |
| | | | | 709/224 |
| 2006/0059163 A1 * | 3/2006 | Frattura | ........... | H04L 12/4633 |
| 2006/0083511 A1 * | 4/2006 | Edmunds | ........... | H04B 10/0795 |
| | | | | 398/25 |
| 2008/0028467 A1 * | 1/2008 | Kommareddy | ........... | H04L 63/1458 |
| | | | | 726/23 |
| 2009/0303883 A1 * | 12/2009 | Kucharczyk | ........... | H04L 12/4645 |
| | | | | 370/241 |
| 2009/0323703 A1 * | 12/2009 | Bragagnini | ........... | H04L 29/12009 |
| | | | | 370/401 |

(Continued)

*Primary Examiner* — Samson B Lemma
*Assistant Examiner* — Richard W Cruz-Franqui
(74) *Attorney, Agent, or Firm* — James M. Smedley LLC; James Michael Smedley, Esq.

(57) ABSTRACT

The present invention generally relates to detecting malicious network activity coming from network devices such as routers and firewalls. Specifically, embodiments of the present invention provide for detecting stealth malware on a network device by comparing inbound and outbound network traffic to discover packets originating from the network device and packets that violate configuration rules. When combined with a network traffic monitor server configured to monitor actual network traffic reports and to receive known network traffic reports from host computers, the system can detect stealth network traffic originating from both network devices and host computer systems.

18 Claims, 10 Drawing Sheets

(56) References Cited

U.S. PATENT DOCUMENTS

| | | | |
|---|---|---|---|
| 2011/0004876 A1* | 1/2011 | Wu | H04L 12/4625 |
| | | | 718/1 |
| 2011/0080829 A1* | 4/2011 | Breslin | H04L 41/0816 |
| | | | 370/235 |
| 2014/0122874 A1* | 5/2014 | Janakiraman | H04L 63/306 |
| | | | 713/160 |
| 2015/0128246 A1* | 5/2015 | Feghali | H04L 63/0209 |
| | | | 726/13 |
| 2016/0021131 A1* | 1/2016 | Heilig | H04L 63/1425 |
| | | | 726/23 |
| 2016/0248655 A1* | 8/2016 | Francisco | H04L 43/028 |
| 2016/0261611 A1* | 9/2016 | Heilig | H04L 63/1425 |

* cited by examiner

IDENTIFYING MALWARE-INFECTED NETWORK DEVICES THROUGH TRAFFIC MONITORING

RELATED APPLICATIONS

This application is a continuation-in-part of and claims priority to U.S. patent application Ser. No. 14/336,004, entitled "Identifying Stealth Packets in Network Communications Through the Use of Packet Headers" filed Jul. 21, 2014, the contents of which is herein incorporated by reference in its entirety.

FIELD OF THE INVENTION

The present invention generally relates to detecting malicious network activity coming from network devices such as routers and firewalls. Specifically, embodiments of the present invention provide for detecting stealth malware on a network device by comparing inbound and outbound network traffic to discover packets originating from the network device and packets that violate configuration rules. When combined with a network traffic monitor server configured to monitor actual network traffic reports and to receive known network traffic reports from host computers, the system can detect stealth network traffic originating from both network devices and host computer systems.

BACKGROUND OF THE INVENTION

Traditional malware is typically programmed to infect and run on personal computers and servers with standard operating systems (OSs) installed. These types of machines are common and often inadequately protected from malware attacks. The ease with which a piece of malware can find an unprotected standard OS computer is one reason why most malware is written to infect these systems. However, malware can also be written to infect non-standard or application-specific OSs, such as the software that runs on and manages firewalls, routers, and other network infrastructure devices.

Malware written to infect network infrastructure hardware such as routers, firewalls, or other network devices is less common but can still be a significant threat. Network devices can be thought of as special purpose computers. They run an operating system, often some kind of Linux, and they run applications specific to the functionality of the device. Just like a regular computer, these devices can become infected with malware. But there are no easy ways to determine whether a network device is compromised by examining the device itself. Because they are mostly closed systems, it is not possible to install third-party security software on the device. A network administrator can examine the device and settings of the system, but sufficiently advanced malware could spoof any data presented back to the administrator. If there is a hardware implant then detection is pretty much impossible from just examining device settings.

Intrusion detection systems (IDSs) can detect malware infections of the network hardware, but IDSs are typically signature-based solutions which means the device must know about the existence of a particular attack before it can be detected. If the router or firewall is compromised with a new or novel piece of malware, there will be no known signatures for it and as long as it sends packets that conform to RFC standards with proper headers and normal-looking payloads, there is nothing to tell the IDS that the packet is from a malicious source.

Compromised networked devices are particularly insidious for a number of reasons. First, a router or firewall has access to all network traffic which means the malware could harvest data as it passes through to be exfiltrated at a later time. We also expect these devices to protect all other devices from compromise. So if the firewall is compromised, it could allow in or out data that otherwise would not be allowed. And, as stated before, there is no easy way to monitor these devices so users must make major assumptions that the manufacturer built a solid device with no bugs and that the device was not tampered with at any time. Both of these are difficult to guarantee.

SUMMARY OF THE INVENTION

Accordingly, it is an object of the present invention to provide a system and method for detecting malware infections on network devices by comparing incoming and outgoing network traffic on a particular network device.

A system for detecting malware in network devices comprises a first network tap; and a first network monitor server configured to: receive entering network packets and exiting network packets corresponding to one or more network devices, determine matching packets between said entering network packets and said exiting network packets, generate an alert when no matching entering packet can be determined for one or more exiting packets.

The system further comprises a second network tap; and wherein said first network monitor server is further configured to: receive LAN side network traffic from said first network tap, receive WAN side network traffic from said second network tap.

The system is further configured to: detect unauthorized packets by finding exiting packets without a corresponding entering packet, detect exiting packets with modified payloads by comparing a hash corresponding to each exiting packet to a hash of one or more entering packets, detect a LAN side exiting packet which does not have a corresponding LAN side entering packet that is a request for said LAN side exiting packet.

The system is further configured to compare entering packets collected at time T to exiting packets collected within a time frame beginning at time T and ending at time T plus a delta time value.

The system of claim 1 wherein said first network monitor server is further configured to: receive a configuration profile corresponding to said one or more network devices, detect an exiting packet which violates one or more rules in said configuration profile.

The system is further configured to: receive a known network traffic report corresponding to a host computer system on a separate physical machine from said first network monitor server, wherein said known network traffic report comprises information about all network traffic known to an operating system of said host computer system; and compare individual packet headers from said known network traffic report to individual packet headers from said entering network packets and/or said exiting network packets to identify stealth network traffic not reported in said known network traffic report.

The system further comprises a server module configured to: receive a known network traffic report corresponding to a host computer system on a separate physical machine from said server module, wherein said known network traffic report comprises information about all network traffic known to an operating system of said host computer system; receive network traffic information corresponding to said entering packets and said exiting packets; a calculation module configured to compare individual packet headers from said known network traffic report to packet header information from said entering packets and/or said exiting packets to identify stealth network traffic not reported in said known network traffic report.

The system is further configured to: select at least one NAT-modified packet to compare to at least one original packet; compare packet header information that is not modified by NAT of said at least one NAT-modified packet to corresponding packet header information of said at least one original packet, wherein said packet header information is selected from the group consisting of: source IP address, source port, destination IP address, and destination port; perform an original packet hash on one or more of packet payload, source IP address, source port, destination IP address, and destination port of said at least one original packet; compare said original packet hash to a corresponding hash of said at least one NAT-modified packet.

The system is further configured to compare one or more TCP packet attributes of said at least one NAT-modified packet to corresponding TCP packet attributes of said at least one original packet, wherein said one or more TCP packet attributes are selected from the group consisting of: sequence number, acknowledge number, and TCP checksum.

The system is further configured to compare packet payload size of said at least one NAT-modified packet to payload size of said at least one original packet.

A method for detecting malware in network devices comprises the steps of: receiving network traffic information corresponding to entering packets and exiting packets of one or more network devices; comparing entering packets to exiting packets; determining exiting packets which do not have a corresponding entering packet.

The method further comprises the steps of: computing an exiting packet hash based, at least in part, on an exiting packet payload; computing an entering packet hash based, at least in part, on an entering packet payload; comparing said exiting packet hash to said entering packet hash.

The method further comprises the steps of: recording entering packets which are outbound requests for data; comparing one or more inbound packets to said outbound requests for data; detecting one or more inbound packets which do not have a corresponding said outbound request for data.

The method further comprises the steps of: receiving a known network traffic report corresponding to a host computer system, wherein said known network traffic report comprises information about all network traffic known to an operating system of said host computer system; and comparing packet header information from said known network traffic report to packet header information from said entering packets and/or said exiting packets to determine packets which are not reported in said known network traffic report.

The method further comprises the step of comparing one or more entering packets collected at time T to one or more exiting packets collected within a time frame beginning at time T and ending at time T plus a delta time value.

The method further comprises the step of comparing at least one of source IP address, source port, destination IP address, and destination port of an exiting packet to corresponding header information of an entering packet The method further comprises the steps of: computing an entering hash based on said entering packet, computing an exiting hash based on said exiting packet, comparing said entering hash to said exiting hash, determining that said exiting packet is a NAT-modified version of said entering packet based on comparison of said entering hash and said exiting hash.

The method further comprises the step of comparing payload size of said entering packet with payload size of said exiting packet.

The method further comprises the step of comparing at least one of TCP sequence number, TCP acknowledge number, and TCP checksum between said entering packet and said exiting packet.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

Figure 1:
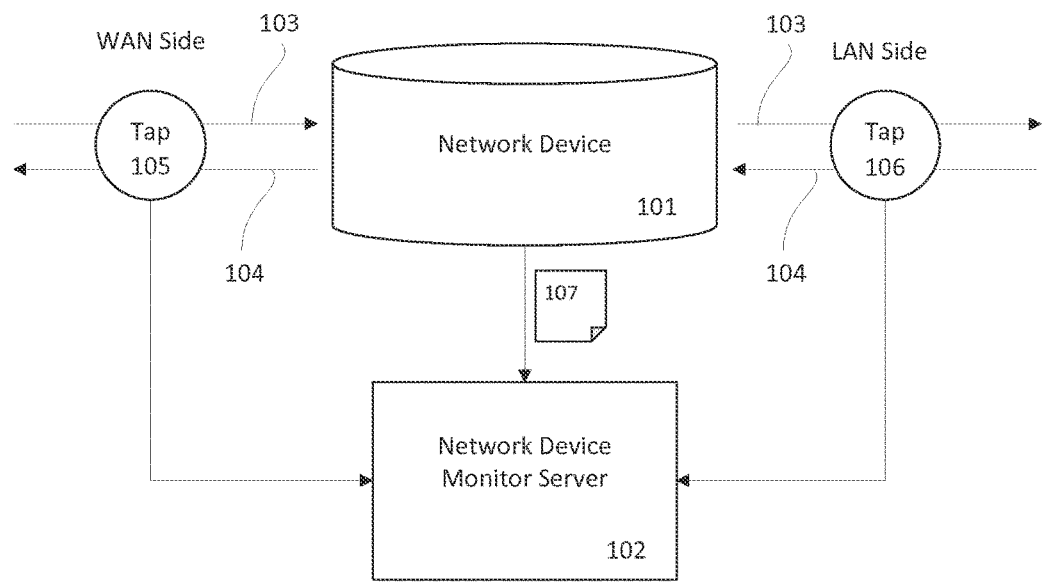
FIG. 1 is a diagram of a network device monitoring system according to an embodiment of the present invention.

The present invention generally relates to detecting malicious network activity coming from network devices such as routers and firewalls. Specifically, embodiments of the present invention provide for detecting stealth malware on a network device by comparing inbound and outbound network traffic to discover packets originating from the network device and packets that violate configuration rules. When combined with a network traffic monitor server configured to monitor actual network traffic reports and to receive known network traffic reports from host computers, the system can detect stealth network traffic originating from both network devices and host computer systems.

Throughout the description below, the term inbound will be used to refer to network traffic entering the network or subnet from outside, for example WAN side to LAN side on a firewall. The term outbound refers to network traffic leaving the network, or packets heading from the LAN side to the WAN side of the network device. Entering packets or entering traffic are packets or network traffic received by the network device or entering the network device regardless of which side of the device (WAN or LAN) they are entering from. In like manner, exiting packets or exiting traffic are packets or network traffic leaving the network device or passed on by the network device toward the final destination.

In network communications, a packet has many layers where each layer contains a header and a payload. The payload of the lower layers contains the header and payload of the next higher layer. Therefore, the term payload may refer to both the header and payload together of a higher level layer. Generally speaking, header information at any layer is referred to as the header and the user data payload is referred to as the payload. However, because of the nested structure of network communication packets, there will be situations where it is reasonable to one or ordinary skill in the art to interpret a packet payload as including the header information of one or more layers in the packet.

In general, a network device monitoring system of the present invention can be described as comprising a network device monitor server and one or more network taps or network capture devices. The network taps tap into network communications and copy network traffic to the network device monitor server. The network device monitor server then compares entering and exiting network traffic to determine if any stealth packets or otherwise unauthorized packets exist. Stealth packets are network traffic that shows up on the network but is unknown to any of the devices which are authorized to produce network traffic. Stealth traffic may appear to originate from a specific machine on the network, but does not show up in that machine's network traffic reports. More specifically, when monitoring a firewall or router the network device monitor server will collect outgoing traffic on the LAN side and compare it to outgoing traffic on the WAN side. If there are any packets on the WAN side which were not seen on the LAN side, the network device monitoring sever determines that the packet was sent from the network device itself and generates an alert. The network device monitor server can also detect unauthorized inbound network traffic and illegally modified packets.

Many network devices are able to update their own firmware or send messages to each other to coordinate and optimize network traffic routing. When sending messages to other network devices, network devices use special protocols (OSPF, RIP, BGP, etc) that are encapsulated within layer 2, 3, and 4 of the OSI model protocols. This kind of network traffic can be mistaken for malware-generated traffic because it originates from the network device itself. In order to prevent false positives, when these types of protocols are found, we can validate that they only contain the information that these protocols are supposed to contain, that they are addressed to devices which we have observed from monitoring and processing the traffic, and that they do not deviate from RFC norms. When auto-updating their firmware, we can check the update IP address against a list of known good addresses the particular device is allowed to communicate with or we can just disable auto-updating entirely. If these criteria are met, then we can exclude this network traffic from further inclusion in malware detection activities.

The network device monitor server can also be combined with the stealth packet detection system of the parent application entitled "Identifying Stealth Packets in Network Communications Through the Use of Packet Headers" filed Jul. 21, 2014, incorporated by reference herein. A network monitor server retrieves network traffic from the firewall tap on the LAN side and receives reports of actual network traffic from the central processing server, or gathers information on network traffic from other network taps or network capture devices. The network monitor server then compares network traffic on the LAN side of the firewall to actual network traffic to and from the host machines on the network. If there are discrepancies, then one of the network devices within the network may be infected with malware or otherwise compromised. These and other features of the present invention will now be described in greater detail with reference to the figures.

FIG. 1 illustrates how a network device monitor server 102 of the present invention interfaces with a network device 101 for malware detection and traffic monitoring according to an embodiment of the present invention. A first tap 105 is placed on the WAN side of the network device 101 and a second tap 106 is placed on the LAN side of the network device 101. The taps 105, 106 should be placed such that they are able to see all incoming network traffic 103 and all outgoing network traffic 104. When the network device 101 is a firewall, properly tapping the connections is fairly simple because there is typically a single physical connection on each of the WAN side and the LAN side. In the case of a router or router/firewall combination, The WAN side typically still only has a single physical connection, but the LAN side may have multiple physical connections. The individual LAN side ports can each be tapped individually, or they may be aggregated into a single port by using a port aggregator, a network switch, or any device that provides a single data stream from multiple data streams. Although port aggregators and switches that do not run software are not vulnerable to software-based malware, they may still be vulnerable to physical bugs. This risk can be mitigated by physically securing network hardware.

The taps 105, 106 make a copy of network traffic and the copy is sent to the network device monitor server 102. The network device monitor server can detect unauthorized network traffic by examining only the information in the packet headers, without examining the actual user data payloads of the packets. This is possible because the very existence of a packet on one side of the network device when the same packet never showed up on the other side of the network device indicates that the packet came from within the network device itself and is unauthorized. In some situations, such as when Network Address Translation (NAT) is used, it is desirable to compare a hash of the payload or other payload metadata, but it is not necessary to directly use the contents of the user data payload. The network device monitor server 102 may reside on a dedicated physical machine or may be one of many network device monitor servers that reside on a network management server physical machine. Other network device monitor servers monitoring other portions of the network may also reside on the network management server together with the network device monitor server 102. In a preferred embodiment of the present invention, the network device monitor server 102 is implemented as a software module running on a physical machine. In another embodiment, the network device monitor server 102 is implemented in hardware or with a combination of hardware, firmware and/or software. One or ordinary skill in the art would recognize that the network device monitor server 102 may be implemented with any mix of hardware, firmware, and software without departing from the spirit and scope of the present invention.

According to another embodiment of the present invention, the network device monitor server 102 may also obtain a network device configuration profile 107 from the network device 101. The configuration profile 107 may include firewall settings, port forwarding, or other network management settings. The network device monitor server may then compare network traffic from the taps 105, 106 to the configuration profile 107 in order to verify that the network device or firewall is actually behaving correctly.

Figure 2:
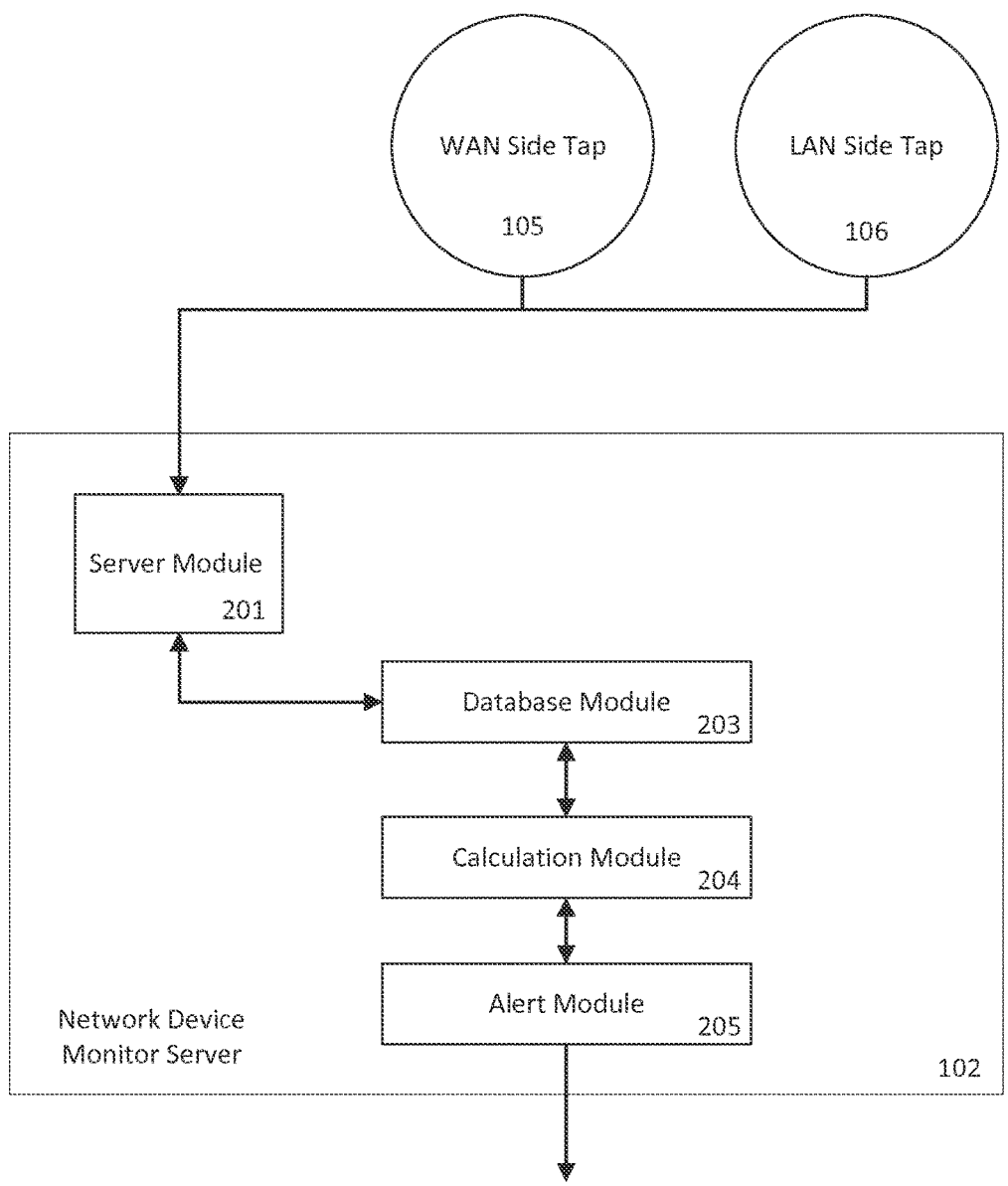
FIG. 2 is a block diagram of a network device monitor server according to an embodiment of the present invention.

FIG. 2 shows a block diagram of a network device monitor server 102 according to a preferred embodiment of the present invention. A server module 201 coordinates communication with the WAN side tap 105 and the LAN side tap 106 to collect network traffic information. The server module 201 receives network traffic from the taps 105, 106, and sends it to the database module 203. The database module 203 stores data used to perform the various calculations or comparisons and the results of those calculations or comparisons. The calculation module 204 is the heart of the network device monitor server 104, as it performs the comparison between the LAN side network traffic 106 and WAN side network traffic 105. The calculation module 204 identifies unauthorized network traffic, stealth packets, or packets originating from the network device by (1) comparing WAN side traffic to LAN side traffic, (2) comparing network traffic to outgoing requests, and (3) comparing network traffic to a configuration profile 107. The results of these comparisons are stored with the database module 203. If unauthorized network traffic 211 is detected, the alert module 205 sends an alert. Detailed descriptions of the algorithms used to detect unauthorized outbound traffic, modified packets, and inbound traffic are disclosed below with reference to FIGS. 3-5.

Figure 3:
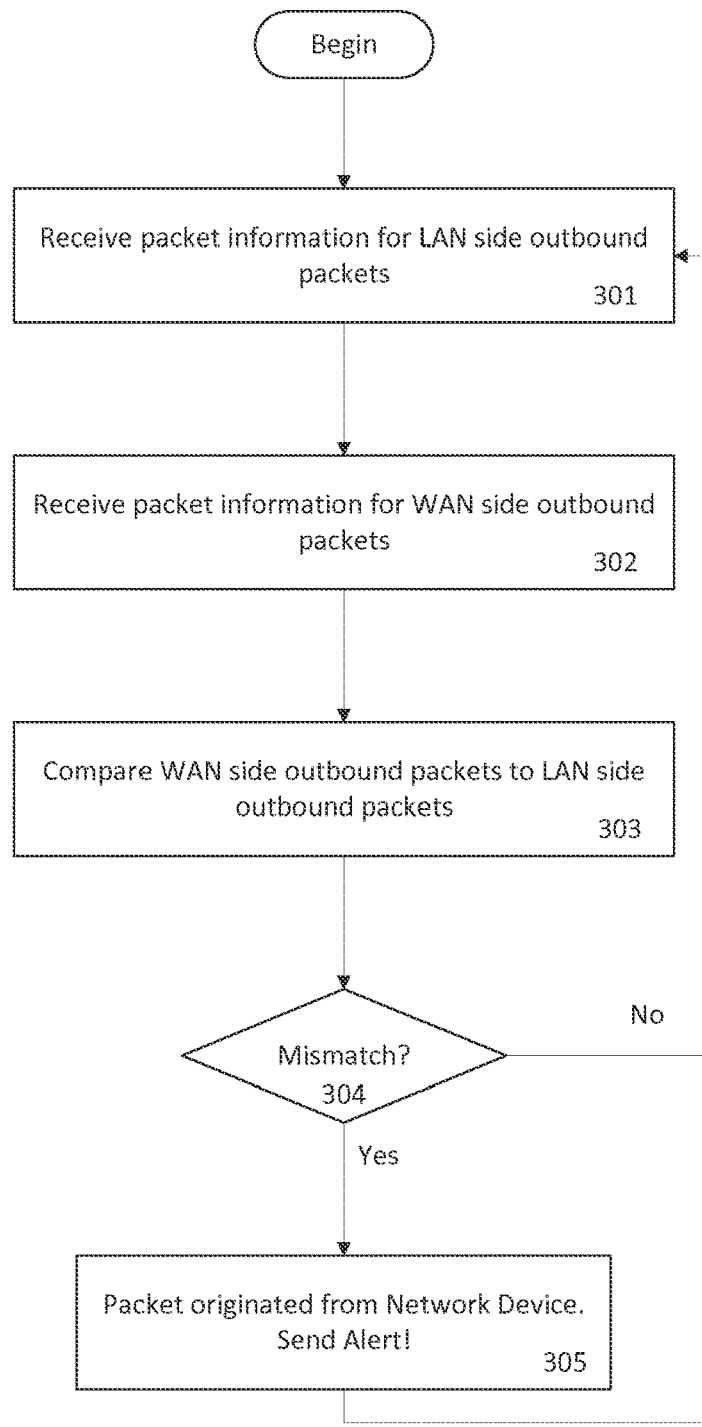
FIG. 3 is a flowchart depicting the steps for detecting malware that may be attempting to send data out of the network from a network device according to an embodiment of the present invention.

FIG. 3 shows a flowchart depicting the process of detecting unauthorized outbound network traffic. Outbound network traffic is network traffic moving from the LAN side of a network device to the WAN side of a network device. One example of unauthorized outbound traffic is malware trying to send stolen data outside the network. When malware infects a network device, it may collect data from the network traffic and then repackage it and send it home. The network device monitor server will detect this kind of unauthorized traffic or any network traffic originating within the network device it monitors through the process described in FIG. 3.

In step 301, the network device monitor server 102 receives packet information corresponding to outbound packets from the LAN side tap 106 at the server module 201.

At step 302, the network device monitor server 102 receives packet information from the WAN side tap 105 at the server module 201. Packet information is stored in the database module 203. Although only packet headers are required to detect unauthorized outbound or inbound traffic without NAT, the taps 105, 106 will send a full copy of network traffic, so that the server module 201 or calculation module 204 can extract the packet header and other required information from the packet which is required for detecting unauthorized network traffic.

In step 303 the calculation module 204 then compares the WAN side outbound packet headers to the LAN side outbound packet headers. At step 304, if there are packet headers collected from the WAN side that do not show up in the packet headers collected from the LAN side, then the packet originated from the network device 101 and an alert is generated from the alert module 205 in step 305. An alert may be generated by sending an email, text message, creating a log entry or log file, or any other electronic means of notifying a system administrator or creating a record of the detected anomaly. One or ordinary skill in the art would recognize that any method of notifying administrators or generating an alert could be used without departing from the spirit and scope of the present invention. If no discrepancies are found, the network device monitor server 102 continues to monitor traffic by returning to step 301.

Figure 4:
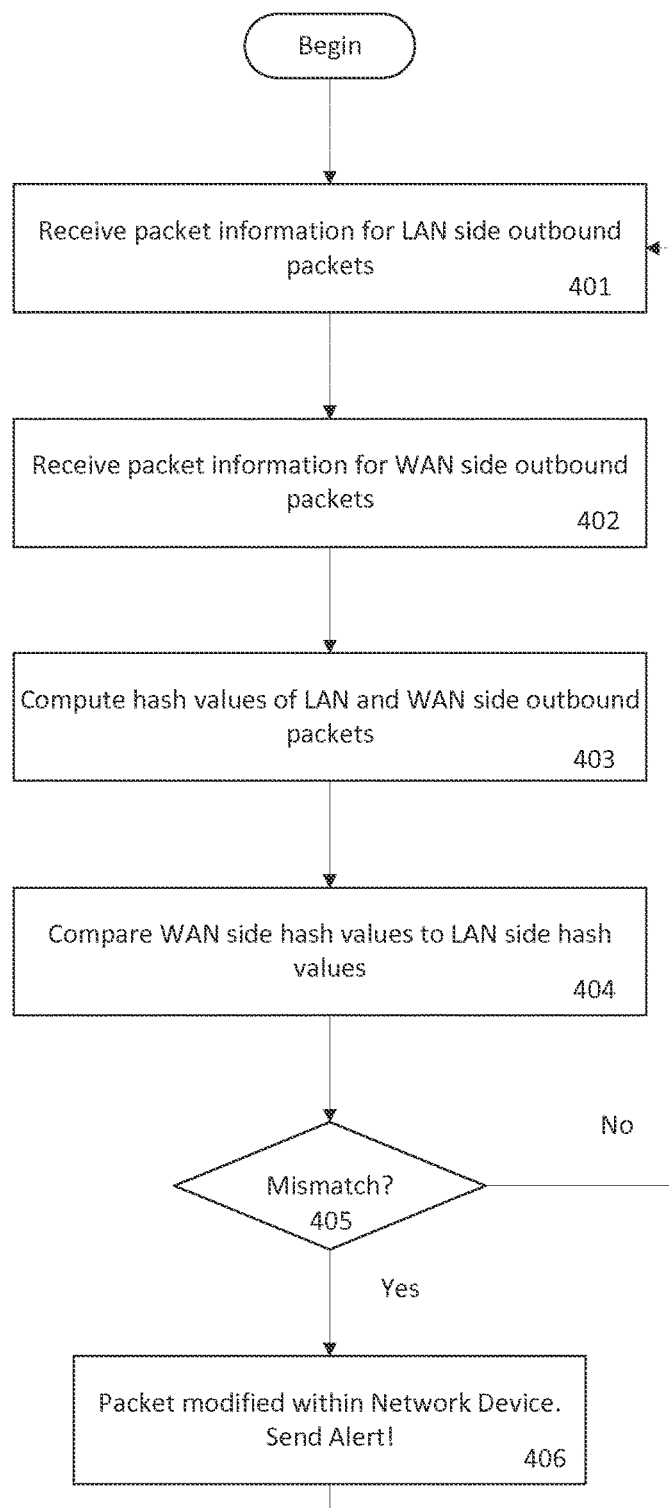
FIG. 4 is a flowchart depicting the steps for detecting malware that may be attempting to modify packets heading out of the network from a network device according to an embodiment of the present invention.

FIG. 4 shows a flowchart for a method of detecting outbound packets that are modified by malware residing on the network device. Although the method of FIG. 3 can detect stealth packets that originate from the network device, it will fail to detect otherwise legitimate packets that have been modified to carry a malicious payload or steal data from within the network device.

At step 401, the network device monitor server 102 receives outbound packets from the LAN side tap 106 at the server module 201. In step 402, the network device monitor server 102 receives outbound packets from the WAN side tap 105 at the server module 201. At step 403, the server module 201 computes hash values of the packets from both the LAN side and the WAN side.

Alternatively the packet payload could be compared directly, but hashing helps to protect data privacy, and reduces computational power required when the same packets are being compared multiple times. The hash function used on packets may be MD5, SHA, or any other hash function suitable for generating unique values that are relatively easy to compare from large inputs. There are two general hashing strategies that can be used when comparing packets. The first strategy is to hash one or more immutable values in the packet header. Generally as more information is included in the hash input, the reliability of the hash for uniquely identifying the packet increases. The second strategy is to compute a hash on the user data payload itself. If malware is able to modify packets within a network device, it would be trivial to modify the packet payload without making any changes to the header. Therefore, hashing the packet payload provides a method of detecting this kind of unauthorized modification. The first and second strategy are not mutually exclusive, and both could be used together or the payload and one or more immutable fields could be combined as input to a single hashing step. One of ordinary skill in the art would recognize that a variety of different portions of the packet payload and header could be hashed individually or in combination in order to detect certain modifications that malware could make to packets to achieve nefarious purposes.

The packets and hash computation results are stored with the database module 203. At step 404, the calculation module 204 compares the hash values of WAN side outbound packets against the hash values of LAN side outbound packets. If there are any hash values that do not correlate or match in step 405, then the corresponding packet was modified within the network device and the alert module 205 generates an alert in step 406. If no discrepancies are found, the network device monitor server 102 continues to monitor traffic by returning to step 401.

The processes of FIG. 3 and FIG. 4 can be reversed to detect unauthorized inbound network traffic. Inbound network traffic is network traffic which moves from the WAN side to the LAN side of the network device. It is typically directed to one of the host computers on the network. When applied to inbound network traffic, the method described in FIG. 3 detects packets originating from the network device itself. The process of FIG. 4, applied to inbound network traffic, detects malicious payloads inserted into packets received at the WAN side and headed toward a host computer system or another device on the network. Modified packets are not detected by the process of FIG. 3 because that process relies on the absence of the packet on one side of the network device. Modified packets are captured on both sides of the network device, but their nature changes within the network device as a result of a malware infection. Therefore, a hash is computed to determine if the packet contents has changed between being captured on the WAN side and LAN side.

Although the methods described herein are explained with reference to a router or firewall, the same methods can also be applied to a network switch, hub, or other network device. One or ordinary skill in the art would recognize that the systems and methods described herein could be applied to any network device without departing from the spirit and scope of the present invention.

Although inbound network traffic originating from the network device can be detected through a process similar to that described in FIG. 3, and modified packets can be detected by adapting the process of FIG. 4, there are still some malicious packets which neither of these processes will detect. In the particular case of a firewall, there is certain inbound network traffic that will be blocked, and other inbound network traffic that will be allowed, according to the configuration profile 107 of the firewall. However, if malware infects the firewall, it may allow malicious packets that should be blocked to leak through the firewall. These unauthorized packets are captured on both the WAN side and LAN side, and remain unmodified, so they will not be detected by either of the strategies described in FIG. 3 and FIG. 4.

Figure 5:
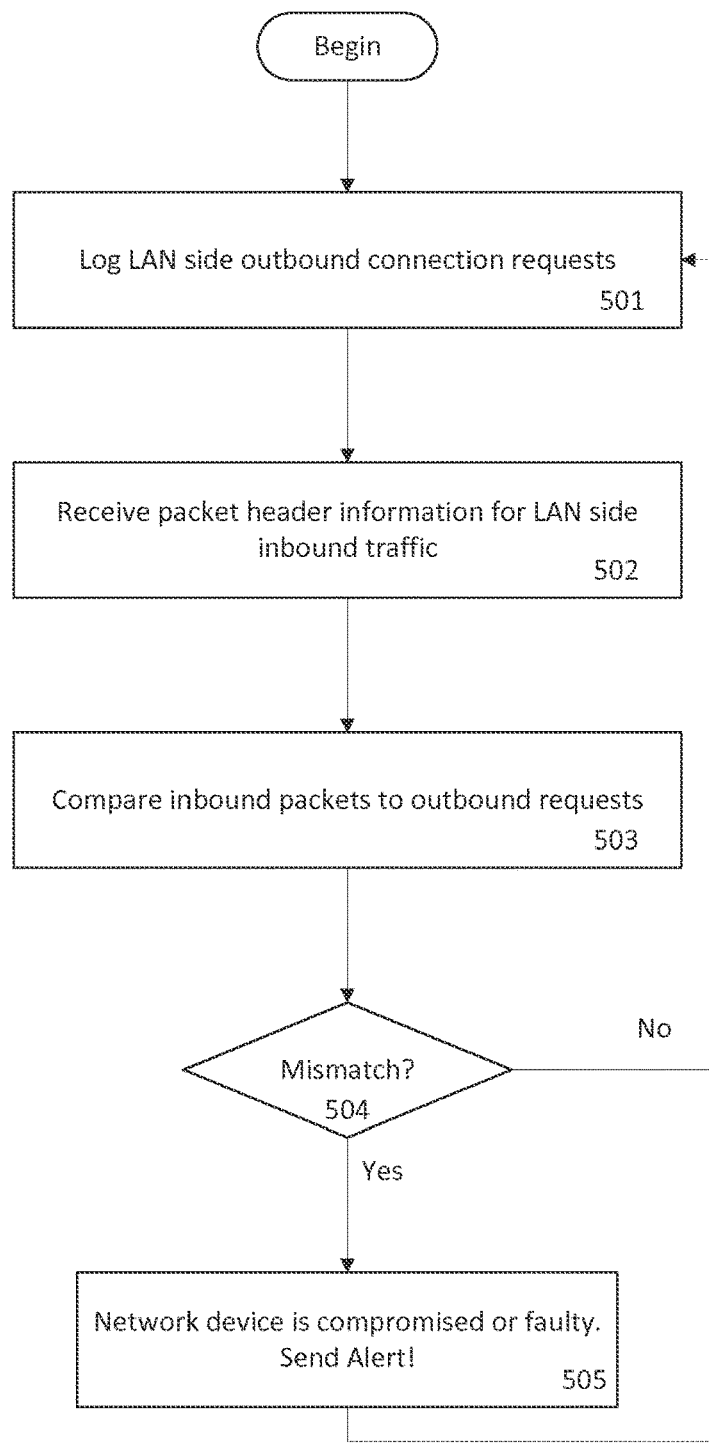
FIG. 5 is a flowchart depicting the steps for detecting unauthorized inbound network traffic that does not have a corresponding outbound request according to an embodiment of the present invention.

FIG. 5 shows a flowchart of a method for detecting unauthorized inbound network traffic that bleeds through a malware-infected firewall. In general, when a stateful communication protocol such as TCP (Transmission Control Protocol) is used, inbound network traffic should only be allowed in response to an outbound request for data. Therefore, in Step 501, the network device monitor server logs outbound connection requests, storing them with the database module 203. At step 502, the network device monitor server 102 receives inbound packets from the LAN side tap 106 at the server module 201 and stores the inbound packets with the database module 203. At step 503, the calculation module 204 checks with the database module 203 for an outbound connection request for each inbound packet collected. At step 504, if there are any mismatches where an inbound packet has been passed through the firewall with no corresponding outbound request, then at Step 505, the alert module 205 generates an alert. If there are no anomalies in the network traffic, the network device monitor server returns to step 501 to continue checking.

When a stateless communication protocol such as UDP (User Datagram Protocol) is used, there will not necessarily be a corresponding outbound request for all inbound packets. Stateless communications may be allowed to pass through the firewall by setting up a firewall rule opening a particular communication port. This port information can be included in the network device configuration profile. The network device monitor server can check incoming traffic against this configuration profile to verify that it is being properly allowed or blocked.

According to an embodiment of the present invention, the network device monitor server 102 is configured to work in a wireless network environment. The WAN side tap remains wired, but the LAN side tap comprises a wireless Network Interface Card configured with the Wi-Fi network channel and security settings and set in promiscuous mode. The wireless NIC picks up all traffic on the wireless LAN and the network device monitor server processes the data to extract packet information to be used for comparison with WAN side traffic. Once network packets are extracted from the wireless data, comparisons proceed in the same manner as a wired network device monitor server.

The above description with reference to FIGS. 1-5 describes an exemplary embodiment and various methods of detecting unauthorized network traffic through a network device monitor server of the present invention. According to another embodiment of the present invention, the function of the network device monitor server 102 described herein can be augmented through combination with the central processing server, network capture device and monitoring and reporting modules residing on host computers as described in this application's parent application (application Ser. No. 14/336,004, entitled "Identifying Stealth Packets in Network Communications Through the Use of Packet Headers" filed Jul. 21, 2014). Various benefits and embodiments of this combination are described below.

Figure 6:
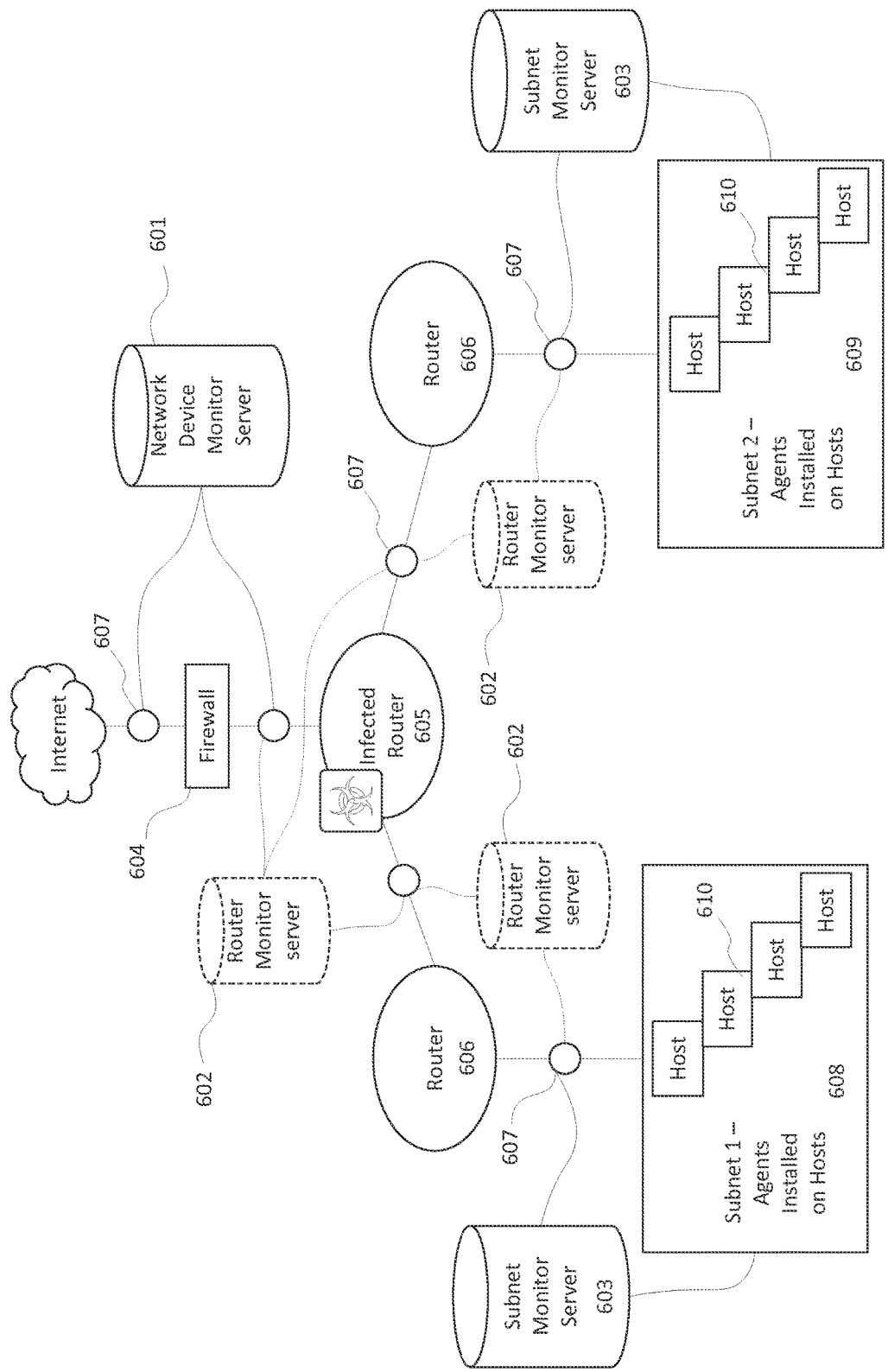
FIG. 6 is a diagram showing a network device monitoring system with multiple network device monitor servers according to an embodiment of the present invention.

FIG. 6 shows a diagram of a network with various monitor servers 601, 602, 603 deployed in a complex networking environment comprising a firewall 604, three routers 605, 606 and two subnets 608, 609. The subnets 608, 609 each comprise a plurality of host computer systems 610 with monitoring and reporting agents installed. The monitoring and reporting agents are also known as monitoring and reporting modules in the parent application. The network device monitor server 601 monitors inbound and outbound traffic at the firewall 604 as described above. Each of the subnet monitor servers 603 collects actual network traffic reports from network capture devices, or taps 607 and known network traffic reports from the monitoring and reporting modules running on the host systems 610. The subnet monitor server then compares known network traffic to actual network traffic and detects stealth packets sent by malware based on network traffic that was detected but did not show up in the known network traffic report. The operation of the subnet monitor server or central processing server is described in detail in this application's parent application (application Ser. No. 14/336,004, entitled "Identifying Stealth Packets in Network Communications Through the Use of Packet Headers" filed Jul. 21, 2014).

If the elements in FIG. 6 with dotted lines are ignored for now, an infected router 605 will still be able to send unauthorized network traffic into and out of the network without detection by the network device monitor server 601 or the subnet monitor servers 603. Outbound unauthorized packets originating from the infected router 605 will show up on both the LAN side and WAN side of the firewall 604, and raise no alerts with the network device monitor server 601. Inbound packets originating from the infected router 605 have bypassed the firewall 604 and will not be blocked. Although these packets might be blocked by software firewalls running on the host systems 610, because the infected router has privileged access to network data, it can spoof the network traffic to a host computer system so that inbound packets appear to be legitimately requested data that the host system firewall will allow through.

One way to solve the problem of an infected router is to place router monitor servers 602 at each router or at-risk network device within the network. A router monitor server is the same as the network device monitor server described above, but need not necessarily have features or functionality that are specific to monitoring firewalls. Any modified packets or unauthorized packets originating from the infected router 605 will be detected by the router monitor server 602 monitoring the infected router 605 through the methods described with reference to FIGS. 3-5. In order to place a router monitor server 602 on each router 605, 606 within the network, network capture devices or taps 607 will need to be placed on the WAN side and LAN side of each router 605, 606 within the network. The primary advantage of this setup is that it allows detection of which specific router 605, 606 is the source of unauthorized network traffic originating within the network. The primary disadvantage of this solution is that it requires placing additional taps within the network, increasing the cost and complexity of the monitoring system.

The router monitor servers 602 shown in FIG. 6 may be independent physical machines or instances of the same software module running on a single physical server. The functions of the router monitor servers 602 can also be incorporated into a single software module that tracks and monitors the traffic on all the routers 605, 606. One or ordinary skill in the art would recognize that any arrangement or combination of router monitor servers may be used without departing from the spirit and scope of the present invention.

Figure 7:
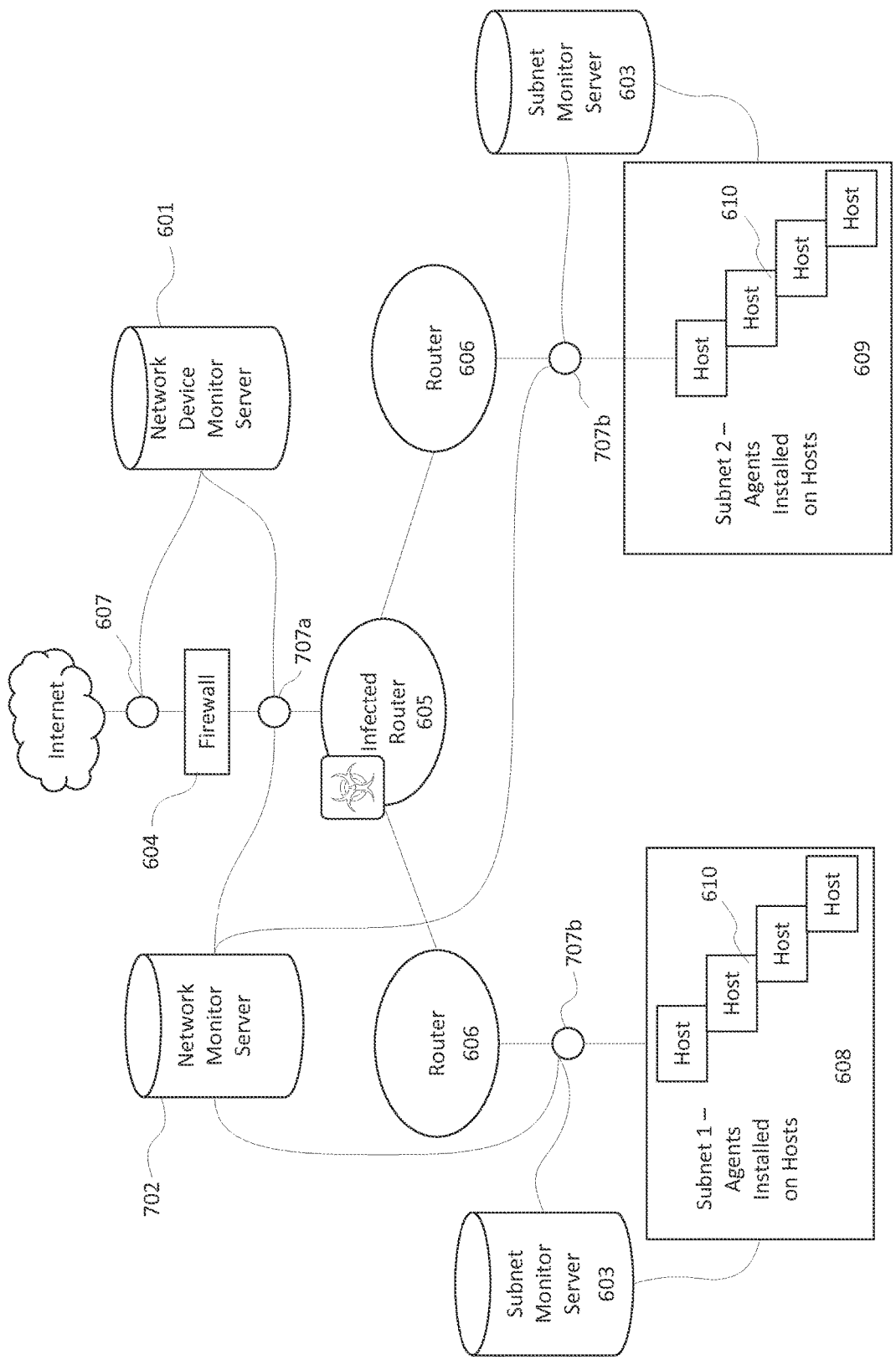
FIG. 7 is a diagram of a network device monitoring system comprising a network device monitor server, a router traffic monitor server, and system agents including monitoring and reporting modules installed on host machines according to an embodiment of the present invention.

An alternate solution to the problem of unauthorized network traffic originating from network devices within the network is shown in FIG. 7. Instead of adding additional taps 607 and a router monitor server 602 for each router 605, 606, a single network monitor server 702 can be used. The network monitor server captures network traffic from the existing taps 707a, 707b already used by the network device monitor server 601 and subnet monitor servers 603. The routers 605, 606 are treated as a single network device with the LAN side tap 707a of the firewall 604 acting as the WAN side tap 707a for the network monitor server 702 and the WAN side subnet taps 707b acting as the LAN side taps 707b for the network monitor server 702. Unauthorized network traffic is detected in the same manner as a network device monitor server. In this manner, the internal network devices can be monitored for unauthorized network traffic. However, in the system depicted in FIG. 7, the network monitor server 702 would not necessarily be able to determine which particular router produced unauthorized network traffic that is detected.

FIG. 7 represents one embodiment of a basic configuration required to detect stealth packets and other unauthorized network traffic on a network. In general, the methods and processes described herein can be used to detect unauthorized network traffic if the following data is collected: network traffic known to the host systems on the network, actual network traffic within the network, and inbound/outbound network traffic on the WAN side of the network. As more taps 607 or network capture devices are added to the network, the network monitoring system can make more accurate determinations of which devices may be infected with malware and producing unauthorized network traffic.

The function of the network monitor server 702 may be incorporated into one or more subnet monitor servers 603 or the network device monitor server 601. Alternatively, the network device monitor server 601 and subnet monitor server 603 may communicate with each other to share data necessary to discover malware-infected network devices within the network. In another embodiment, a single network monitor server 702 may be configured to perform the functions of the network device monitor server 601 and subnet monitor servers 603, including receiving known network traffic reports and actual network traffic reports for each subnet. One or ordinary skill in the art would recognize that any number of monitor servers may be used on the same physical machine or distributed over multiple physical machines, or network data may be sent to a remote location for analysis without departing from the spirit and scope of the present invention.

Figure 8:
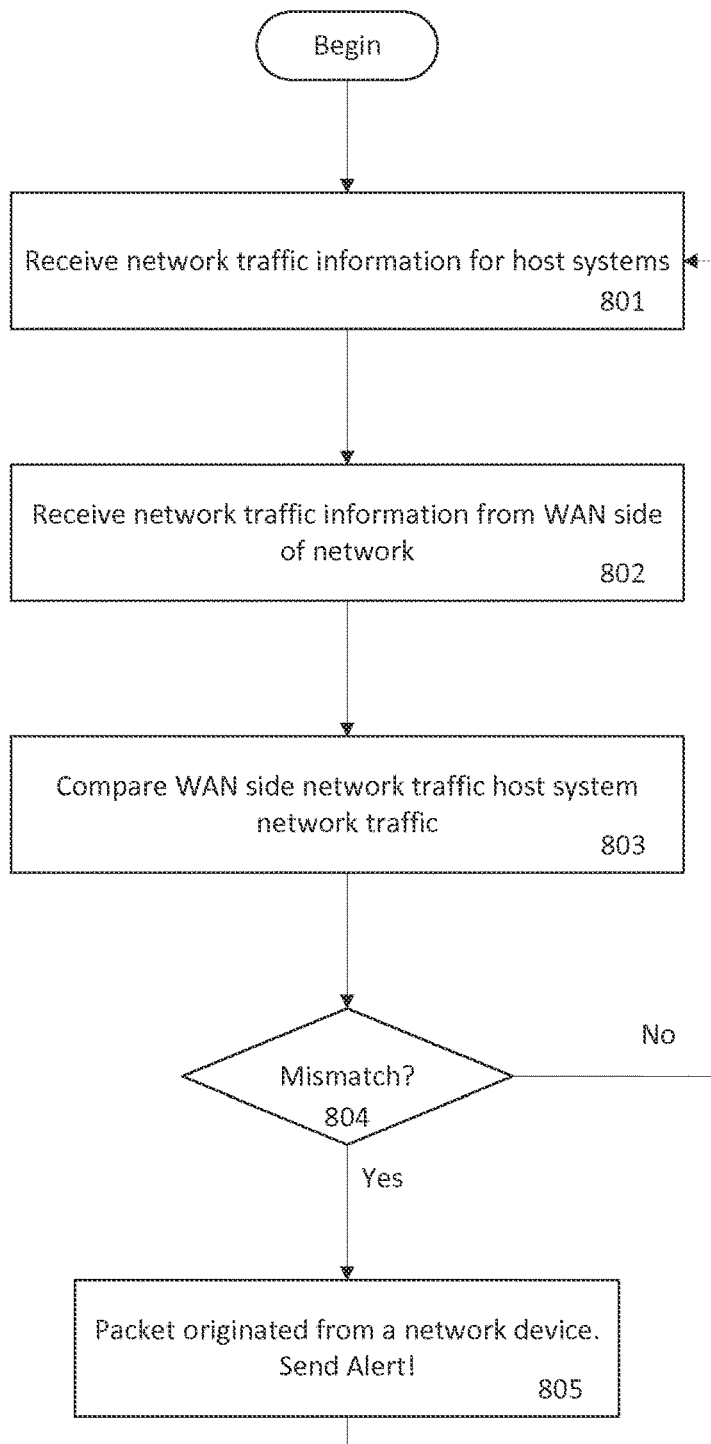
FIG. 8 is a flowchart depicting the steps for detecting malware infecting one of multiple network devices within a network according to an embodiment of the present invention.

FIG. 8 shows a flowchart depicting a general method used by a network monitor system to detect unauthorized traffic originating from compromised network devices. At step 801 the network monitor system receives captured network traffic information corresponding to the host systems 610 on the network. At step 802, the network monitor system receives captured network traffic information from the WAN side of the network. At step 803, the network monitor system compares host system network traffic with WAN side network traffic. If any outbound traffic on the WAN side was not detected from any of the host systems, then a network device has produced the outbound network traffic. If inbound network traffic to the host systems does not have matching inbound network traffic on the WAN side, one of the network devices has produced inbound network traffic. If any inbound network traffic to the host systems does not match an outbound request, either the firewall is compromised or malfunctioning, or a network device in the network produced the network traffic. If the hash values of payload data of inbound network traffic at the host systems do not match the hash values of payload data of the inbound network traffic on the WAN side, then one of the network devices has injected an unauthorized payload into that inbound network traffic. If the hash values of payload data of outbound network traffic on the WAN side do not match the hash values of payload data of the outbound traffic from the host systems, then one of the network devices has injected an unauthorized payload into that outbound network traffic. Any mismatches that are detected in step 804, will cause an alert to be generated in step 805. If no anomalous traffic is detected, the network monitor system returns to step 801 to continue collecting and analyzing network traffic.

Modern network devices often use Network Address Translation (NAT) to map network traffic from one address space to another. This typically involves changing the network address information in IP packet headers. All forms of NAT involve modifying the IP and/or TCP/UDP packet headers in some way. This can include the source and/or destination IP address as well as source or destination port, depending on the direction of travel. Some NAT implementations also modify the TCP sequence number. The network device will keep a NAT lookup table of source and destination IP address and port numbers to track how outbound and inbound packets were translated.

There are four basic types of NAT. Static NAT uses a one-to-one IP address mapping so the same input will always map to the same output. When static NAT is used, a static lookup table is generally provided by the network administrator. This static lookup table can be used to determine what inbound and outbound packets will look like after translation. Dynamic NAT is similar to static NAT, but the NAT lookup table is generated on-the-fly. This is slightly more complicated than static NAT, but typically only a single value in the IP packet header is being changed. Overloading NAT involves a many-to-one IP address mapping where there are many local clients using a single IP address on the internet. In addition to the IP address change, overloading also requires changing the source port of the outbound packet. The network device will store this port mapping in an internal lookup table to be used to re-translate the address of inbound packets to be routed to the correct host system. This is what most home and small business routers use. Overlapping NAT is a lot like static NAT but used for when the connections are between two private networks that share a similar address space. Overlapping NAT may change both source and destination IP addresses and ports.

In addition to the header modification issues, some NAT devices also cause packet fragmentation or will combine fragments before performing translation. What this means is that a single outbound packet may be seen as one packet on the LAN side outbound but as 1+N packets on the WAN side outbound. Or multiple packets on one side will be combined in a single packet on the other side. Packet fragmentation and combination can happen on either outbound or inbound packets. When we need to combine fragmented packets into a single packet in order to find a comparable combined packet produced by the network device, we examine the fragment flag and fragment offset value along with other header attributes. Although the order in which the packet fragments are recorded from the tap and inserted in the database is likely to be the order that they need to be recombined in, it is good to verify that the recombination is correct by checking packet header values.

When NAT is used, the packet that goes in the one side of the network device doesn't always look the same as the corresponding packet that comes out the other side of the network device. Therefore, in order to properly compare network traffic between a WAN side and LAN side where NAT is used, some additional strategies are available.

The network device monitor server 102 collects IP packets from the network traffic and stores them with the database module 203. Since packet headers are modified by NAT, a simple query of the database will not necessarily bring up the desired packets from each side (LAN side and WAN side) of the network device. However, given an original packet entering the network device that has not yet been translated, we can search for exiting packets that fall within a certain timeframe to narrow down the possibilities. A maximum delta time value can be set which represents a maximum amount of time lapsed from the time stamp of the original packet. The amount of time it takes to process a packet is very small, so a delta time value of perhaps a few hundred nanoseconds could be used in many cases. The delta time value can also be adjusted dynamically based on current load conditions on the network device. As load increases and it takes longer to process packets, the delta time value can increase in response to that timing change. One of ordinary skill in the art would be able to determine an appropriate delta time value for a particular model network device. A query for potentially matching packets in the database based on an original packet's time stamp would return all packets within the timeframe defined by the original packet's time stamp plus the delta time value.

Even when packets cannot be perfectly matched based on a value comparison, the number of packets on the WAN side and LAN side should remain equal after accounting for fragmentation, combination, dropped packets, and retransmissions. Therefore, matching the total number of packets into and out of the network device can serve as an additional heuristic for determining if any packets originated from the network device. There are some rare situations where NAT can actually change the payload of the packet. Without going into unnecessary detail, one example of this is an FTP datagram encoding an IP address that NAT must change. In these situations, the entering packet and exiting packet would not look exactly the same, but the reason would not be because of malware. This can generate a false positive alarm. When packets on both sides cannot be matched but are equal in number and have some similar characteristics, they can be excluded from generating alerts. Packets that enter the network device, such as packets addressed for local delivery only, but do not have a matching packet leaving the device are likely dropped packets that can be removed from the overall tally.

When the database is first queried for NAT-modified packets potentially matching the time stamp of an original packet, there may be times when multiple exiting packets appear to match the time stamp of a single entering original packet. This does not necessarily mean there is a problem with the network device. As an example, suppose 10 packets are sent from a host system one right after another to the same destination address. According to an embodiment of the present invention, after some delay that allows for the packets to be collected from both sides of the network, the network device monitor server begins processing the packets collected from both sides of the network device to determine if any packets exiting the network device do not have a corresponding packet entering the network device. When checking for matching packets among those exiting the network device, it is likely that all 10 of the exiting packets will be returned from a database query looking for packets matching the time stamp of the entering packet plus a delta time value. This increases the entering tally by one but increases the exiting tally by ten. However, as the subsequent packets are processed and matches are found among the same packets that matched the first packet, the tally can be adjusted to the point that a one-to-one relationship is found. When an entering packet is processed with a time stamp outside the max delta time value, and the tally for the packets within the same time frame is still incorrect, it can be determined that something other than timing caused a mismatch between the entering and exiting tallies.

Various methods for dealing with different NAT types will now be described with reference to the figures where necessary. After a set of potentially matching NAT-modified packets that have a time stamp within a given time frame have been returned from the database query, as described above, the network device monitor server proceeds to narrow down the set of packets by eliminating from the set any packets that don't match certain criteria. Which criteria are used depends partly on which NAT type the network device uses. In the case of static NAT where the static lookup table is available, the network device monitor server can simply perform the address translation on entering packets by referring to the static lookup table.

Figure 9A:
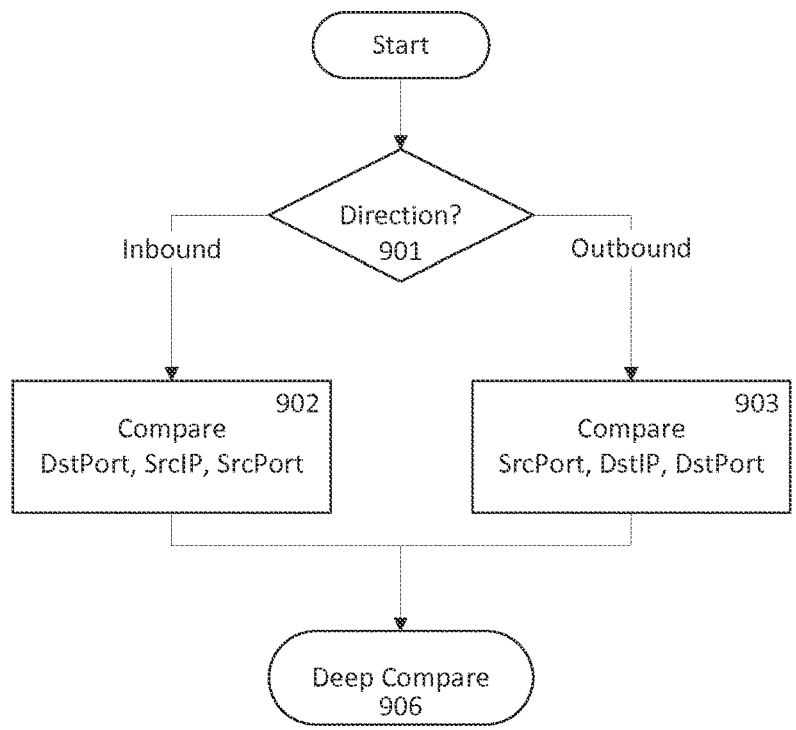
FIG. 9a is a flowchart depicting a method for finding a set of NAT-modified packets potentially matching an original packet where the source IP address is modified by NAT and no lookup table is available according to an embodiment of the present invention.

FIG. 9a shows a flowchart for comparing IP packet headers when a static lookup table is not available or dynamic NAT is used. The original packet header is compared to the header of each packet in the set of potentially matching NAT-modified packets using the steps described below. At step 901, the network device monitor server determines whether the original packet is inbound or outbound. For inbound traffic, static NAT and dynamic NAT will modify the destination IP address. If the original packet is inbound, execution proceeds to step 902, where the unmodified IP header attributes describing the destination port (DstPort), source IP address (SrcIP), and source port (SrcPort) are compared to the original packet. For outbound traffic, static NAT and dynamic NAT will modify the source IP address. If the original packet is outbound, execution proceeds to step 903, where the unmodified IP header attributes describing the source port (SrcPort), destination IP address (DstIP), and destination port (DstPort) are compared to the original packet. Although finding a matching IP address and port does not mean a matching packet has been found, if the address attributes do not match and the correct comparison is being done for the type of NAT used, then the unmatching packet can be safely removed from the set of potentially matching NAT-modified packets. The remaining set of potentially matching packets moves on to the deep compare process 906, which is detailed in FIG. 10.

Figure 9B:
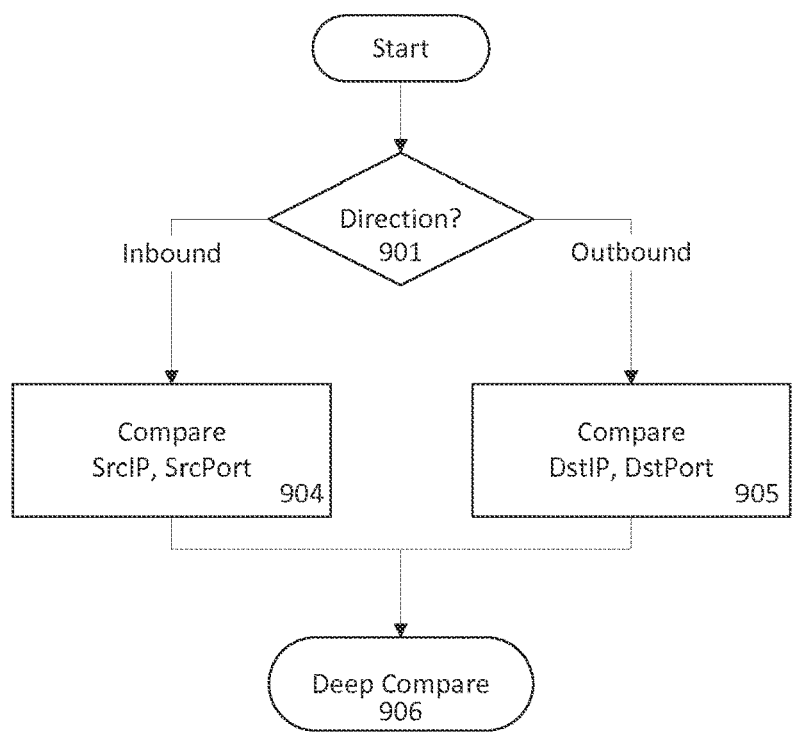
FIG. 9b is a flowchart depicting a method for finding a set of NAT-modified packets potentially matching an original packet where the source IP address and source port are modified by NAT according to an embodiment of the present invention.

FIG. 9b shows a flowchart for comparing packet header information when overloading NAT is used, which changes both the IP address and port number of entering packets. Again at step 901, the network device monitor server determines which direction the original packet is moving. When overloading NAT is used, the network device modifies the destination IP address and port for inbound traffic and modifies the source IP address and port for outbound traffic. The address attributes used to compare the original packet to potentially matching NAT-modified packets are the ones that remain unmodified by NAT. Therefore, inbound traffic is compared to the original packet by the source IP address (SrcIP), and source port (SrcPort) at step 904, and outbound traffic is compared to the original packet by the destination IP (DstIP) and destination port (DstPort) in step 905. Any packets that do not match in the IP address compare steps 904, 905 are eliminated and the remaining set of potentially matching packets moves on to the deep compare step 906, which is detailed in FIG. 10.

Figure 10:
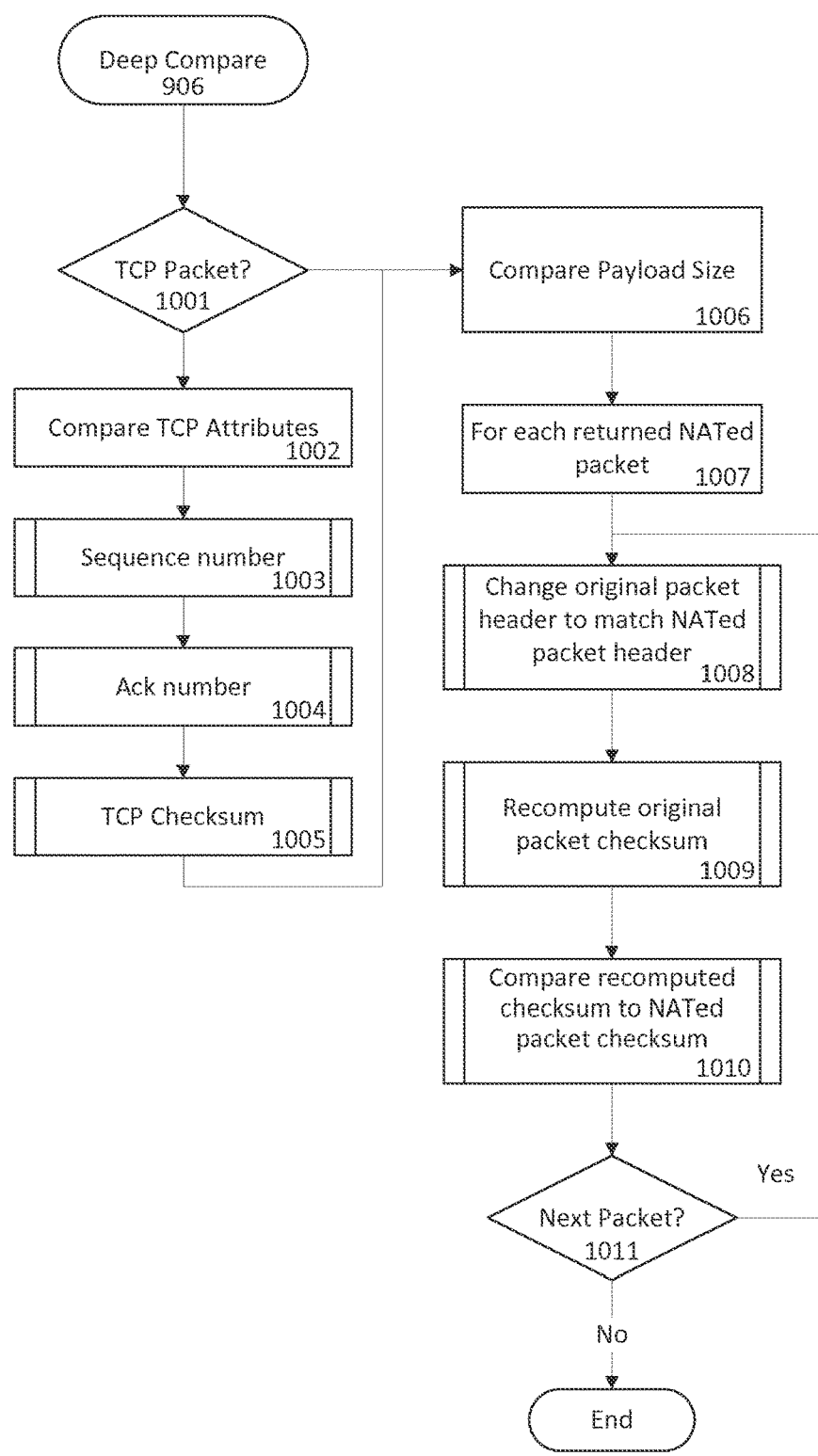
FIG. 10 is a flowchart depicting a method for narrowing down a set of NAT-modified packets potentially matching an original packet and comparing the original packet to the set of NAT-modified packets to determine if any of the NAT-modified packets actually match the original packet according to an embodiment of the present invention.

FIG. 10 shows a flowchart of a deep compare process, where a set of NAT-modified packets potentially matching an original packet is further filtered through additional comparisons, and a final hash comparison is done to determine if any of the potentially matching packets actually match the original packet. The process passes from the flowcharts of FIGS. 9a and 9b to a deep compare at step 906. At step 1001, the network device monitor server determines if the original packet is a TCP packet. If the packet is not a TCP packet, TCP comparison steps 1002-1005 are skipped and the network device monitor server proceeds to compare the payload size in step 1006. If the packet is a TCP packet, step 1002 begins a comparison of TCP attributes in order to further narrow the set of potentially matching NAT-modified packets. In each comparison, finding the same value between the original packet and the NAT modified packets does not mean the two packets are the same, but finding different values indicates the unmatching packet should be removed from the set of potentially matching NAT modified packets. Step 1003 compares the TCP sequence number, step 1004 compares the TCP acknowledge number, and step 1005 compares the TCP checksum. A checksum is just a hash computed using identifying fields in the packet header. Execution then proceeds to step 1006 to compare the payload size. If the payload size is different between the original packet and any packets in the set of potentially matching NAT-modified packets, those packets are excluded from further comparison, narrowing down the possible choices for the final hash comparison of steps 1007-1011.

Beginning at step 1007, the network device monitor server iterates through each packet remaining in the set of NAT-modified packets potentially matching the original packet. At step 1008, the original packet header is modified to match the packet header of the NAT-modified packet. The checksum of the original packet is then recomputed in step 1009 based on the modified packet header. In step 1010, the network device monitor server compares the recomputed original packet checksum to the checksum of the NAT-modified packet that provided the packet header information for modifying the original packet. If these packets have the same checksum, a matching packet has been found, and no alert is generated. If the checksums do not match, the network device monitor server moves to the next packet in step 1011 and repeats steps 1008-1010. When the network device monitor server fails to find a packet matching the original packet, an alert is generated.

In the case of overlapping NAT, the process of comparing IP address and port information, as shown in FIG. 9a and FIG. 9b, is skipped and the process shown in FIG. 10 is used to narrow down the set of potentially matching packets and find a match by re-computing the checksum. Through the process described in FIG. 9a, FIG. 9b, and FIG. 10, the potentially matching packets from a defined time frame that were returned from a database query are narrowed down to a manageable few. Each step of comparison or filtering, eliminates packets from the set of potentially matching NAT-modified packets, until a minimum number of packets remain for a hash comparison. This process helps to reduce the number of hash calculations performed, which are relatively computationally intensive.

After a checksum comparison has been done and a matching packet has been found, it is still possible that malware has modified the packet payload without changing the headers. Therefore, the payload hash comparison described above with reference to FIG. 4 can be done as a final check to make sure the packet has not been modified. As an alternative, steps 1007-1011 can be replaced with a comparison of a hash of the payload, as described above with reference to FIG. 4. In some cases, such as when the hash has already been computed for some or all of the potentially matching packets, skipping the checksum step and going straight to a hash comparison may be faster than doing the checksum first followed by a single hash comparison of the resulting match.

One of the advantages of the present invention is that the actual payload of packets does not need to be directly inspected. All the information required for detecting stealth network traffic is in the packet header or with payload metadata or a hash on the payload. This greatly reduces the amount of storage space required by the present invention, increases the speed with which a network capture report 105 can be transmitted and analyzed, and reduces overhead on the network and computing power required of the central processing server 104.

The alert can be as simple as a notification that stealth network traffic was found. It may also indicate which network device is responsible for the stealth network traffic. However, one of the advantages of the present invention is that, in certain embodiments, discovering which network device caused the alert is trivial because the origin is naturally identified by the position of the tap or network capture device within the network. The information from the headers of these packets could be included in detailed information about the alert so that a qualified network manager can interpret the alert and decide how to address it. In one embodiment of the present invention, the network device monitor server keeps a log of all network traffic captured, including packet payload. This allows the packet's payload to be analyzed to detect a possibly unknown malware threat or identify what data, if any, has been compromised. One of ordinary skill in the art would recognize there are a variety of ways to issue an alert and a variety of levels of detail that an alert can include.

Any monitor server 102, 601, 602, 603, 702 described herein may be implemented either as a standalone physical unit dedicated to the tasks of the monitoring network activity described above, in hardware, firmware, or in software running on a general purpose server on the network. Monitor servers may also be integrated into the same system with the network capture device or central processing server described in the parent application. One or ordinary skill in the art would recognize that there are a variety of ways to implement the various monitor servers without departing from the spirit and scope of the invention.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A network device monitoring system for detecting malware in network devices of a network, the system comprising:
   a network monitor server coupled in series and in parallel with a network monitored device, a series coupling comprising a direct coupling between the network monitor server and the network monitored device and a parallel coupling comprising a first direct coupling between the network monitor server and the network monitored device via a first network tap and a second direct coupling via a second network tap,
   the first network tap comprising three bidirectional ports including:
   a first WAN side input port for receiving WAN side incoming network traffic,
   a first WAN side output port co-located with said first input port for forwarding the incoming WAN side network traffic directly to the monitored network device as outgoing network traffic and,
   a first WAN side monitoring port co-located with said first WAN side input port and said first WAN side output port for forwarding a copy of the incoming WAN side network traffic and the outgoing WAN side network traffic to a network monitor server,
   the second network tap comprising three bidirectional ports including:
   a first LAN side input port for receiving LAN side incoming network traffic,
   a first LAN side output port co-located with said first LAN side input port for forwarding the incoming LAN side network traffic directly to the monitored network device as outgoing network traffic and,
   a first LAN side monitoring port co-located with said first LAN side input port and said first LAN side output port for forwarding a copy of the incoming LAN side network traffic and the outgoing network traffic to the network monitor server, the first network tap configured to:
couple said network monitor server to a WAN side of the monitored network device in said network,
operably communicate with the network monitored device for receiving WAN side network traffic from said network in a coupled state,
copy all incoming and outgoing network traffic data communicated on a WAN side of said network device in said coupled state,
the second network tap configured to:
couple said network monitor server to a LAN side of the monitored network device in said network,
operably communicate with the network monitored device for receiving LAN side network traffic from said network in a coupled state,
copy all incoming and outgoing network traffic data communicated on a LAN side of said network device in said coupled state,
the network monitor server comprising:
a processor, and
a memory coupled to the processor,
the processor configured to:
receive from the first network tap said LAN side network traffic transmitted to and from the monitored network device,
detect a LAN side exiting packet which does not have a corresponding LAN side entering packet that is a request for said LAN side exiting packet,
extract a packet header information portion from the LAN side network traffic,
receive from the second network tap said WAN side network traffic transmitted to and from the monitored network device,
extract a packet header information portion from the WAN side network traffic,
determine matching packets based on a comparison of the extracted header information portions of the LAN side network traffic and the WAN side network traffic, said determination comprising:
comparing at least one source IP element from an extracted packet header information portion of a LAN side exiting network packet with at least one source IP element from an extracted packet header information portion of a corresponding WAN side entering network packet, and
comparing at least one source port element from an extracted packet header information portion of a LAN side exiting network packet with at least one source port element from an extracted packet header information portion of a corresponding WAN side entering network packet, and
comparing at least one destination IP address element from an extracted packet header information portion of a LAN side exiting network packet with at least one destination IP address element from an extracted packet header information portion of a corresponding WAN side entering network packet, and
comparing at least one destination port element from an extracted packet header information portion of a LAN side exiting network packet with at least one destination port element from an extracted packet header information portion of a corresponding WAN side entering network packet, and
comparing at least one source IP element from an extracted packet header information portion of a WAN side exiting network packet with at least one source IP element from an extracted packet header information portion of a corresponding LAN side entering network packet, and
comparing at least one source port element from an extracted packet header information portion of a WAN side exiting network packet with at least one source port element from an extracted packet header information portion of a corresponding LAN side entering network packet, and
comparing at least one destination IP address element from an extracted packet header information portion of a WAN side exiting network packet with at least one destination IP address element from an extracted packet header information portion of a corresponding LAN side entering network packet, and
comparing at least one destination port element from an extracted packet header information portion of a WAN side exiting network packet with at least one destination port element from an extracted packet header information portion of a corresponding LAN side entering network packet, and
generate an alert when no matching WAN side entering packet is found for a corresponding LAN side exiting packet or no matching LAN side entering packet is found for a corresponding WAN side exiting packet based on at least one of said comparisons.

2. The system of claim 1 wherein said first network monitor server is further configured to:
detect exiting packets with modified payloads by comparing a hash corresponding to each exiting packet to a hash of one or more entering packets,
detect a LAN side exiting packet which does not have a corresponding LAN side entering packet that is a request for said LAN side exiting packet.

3. The system of claim 1 wherein said first network monitor server is further configured to:
compare entering packets collected at time T to exiting packets collected within a time frame beginning at time T and ending at time T plus a delta time value.

4. The system of claim 1 wherein said first network monitor server is further configured to:
receive a configuration profile corresponding to said one or more network devices,
detect an exiting packet which violates one or more rules in said configuration profile.

5. The system of claim 1 wherein said first network monitor server is further configured to:
receive a known network traffic report corresponding to a host computer system on a separate physical machine from said first network monitor server,
wherein said known network traffic report comprises information about all network traffic known to an operating system of said host computer system; and
compare individual packet headers from said known network traffic report to individual packet headers from at least one of said entering network packets and said exiting network packets to identify stealth network traffic not reported in said known network traffic report.

6. The system of claim 1
wherein said network monitor server is configured to:
receive a known network traffic report corresponding to a host computer system on a separate physical machine,
wherein said known network traffic report comprises information about all network traffic known to an operating system of said host computer system,
receive network traffic information corresponding to said entering packets and said exiting packets;

a calculation module configured to compare individual packet headers from said known network traffic report to packet header information from at least one of said entering packets and said exiting packets to identify stealth network traffic not reported in said known network traffic report.

7. The system of claim 1 wherein the first network monitor server is further configured to:
select at least one NAT-modified packet to compare to at least one original packet;
compare packet header information that is not modified by NAT of said at least one NAT-modified packet to corresponding packet header information of said at least one original packet, wherein said packet header information is selected from the group consisting of:
source IP address,
source port,
destination IP address, and
destination port;
perform an original packet hash on one or more of packet payload, source IP address, source port, destination IP address, and destination port of said at least one original packet;
compare said original packet hash to a corresponding hash of said at least one NAT-modified packet.

8. The system of claim 7 wherein the first network monitor server is further configured to:
compare one or more TCP packet attributes of said at least one NAT-modified packet to corresponding TCP packet attributes of said at least one original packet, wherein said one or more TCP packet attributes are selected from the group consisting of:
sequence number,
acknowledge number, and
TCP checksum.

9. The system of claim 7 wherein the first network monitor server is further configured to:
compare packet payload size of said at least one NAT-modified packet to payload size of said at least one original packet.

10. A method of operating an external network monitoring system for detecting malware in a network device of a network, the method comprising the steps of:
receiving copies of network traffic information at a network monitor server corresponding to LAN side network traffic comprising LAN side entering packets and LAN side exiting packets of a monitored network device, said LAN side entering and exiting packets being received at the monitored network device from a first network tap comprising LAN side network traffic transmitted to and from the monitored network device,
detecting a LAN side exiting packet which does not have a corresponding LAN side entering request for data,
extracting a packet header information portion from said received LAN side entering and exiting network packets at said network monitor server, receiving copies of network traffic information at said network monitor server corresponding to network traffic comprising entering packets and exiting packets of the monitored network device, said packets being received at the monitored network device from a first network tap comprising WAN side network traffic transmitted to and from the monitored network device, comprising entering WAN side network packets and said packets further being received at the monitored network device from said first network tap comprising WAN side exiting network packets transmitted to and from the monitored network device,
extracting a packet header information portion from said received LAN side entering network packets and said received LAN side exiting network packets at said network monitor server,
determining matching packets based on a comparison of the extracted header information portions of the LAN side network traffic and the WAN side network traffic, said determination comprising:
comparing at least one source IP element from an extracted packet header information portion of a LAN side exiting network packet with at least one source IP element from an extracted packet header information portion of a corresponding WAN side entering network packet, and
comparing at least one source port element from an extracted packet header information portion of a LAN side exiting network packet with at least one source port element from an extracted packet header information portion of a corresponding WAN side entering network packet, and
comparing at least one destination IP address element from an extracted packet header information portion of a LAN side exiting network packet with at least one destination IP address element from an extracted packet header information portion of a corresponding WAN side entering network packet, and
comparing at least one destination port element from an extracted packet header information portion of a LAN side exiting network packet with at least one destination port element from an extracted packet header information portion of a corresponding WAN side entering network packet, and
comparing at least one source IP element from an extracted packet header information portion of a WAN side exiting network packet with at least one source IP element from an extracted packet header information portion of a corresponding LAN side entering network packet, and
comparing at least one source port element from an extracted packet header information portion of a WAN side exiting network packet with at least one source port element from an extracted packet header information portion of a corresponding LAN side entering network packet, and
comparing at least one destination IP address element from an extracted packet header information portion of a WAN side exiting network packet with at least one destination IP address element from an extracted packet header information portion of a corresponding LAN side entering network packet, and
comparing at least one destination port element from an extracted packet header information portion of a WAN side exiting network packet with at least one destination port element from an extracted packet header information portion of a corresponding LAN side entering network packet, and
generating an alert when no matching WAN side entering packet is found for a corresponding LAN side exiting packet or no matching LAN side entering packet is found for a corresponding WAN side exiting packet based on at least one of said comparisons.
wherein the first network tap is directly coupled to a WAN side of the monitored network device comprising three bidirectional ports including:

a first input port for receiving WAN side incoming network traffic, a first output port co-located with the first input port for forwarding the incoming WAN side network traffic directly to the monitored network device as outgoing network traffic, and a first monitoring port co-located with the first input port and the first output port for forwarding a copy of the incoming WAN side network traffic and the outgoing network traffic to a first network monitor server, wherein the first network tap is configured to copy all incoming and outgoing network traffic data being communicated on the WAN side of said network device in said network in a coupled state;

the second network tap directly coupled to a LAN side of a monitored network device in said network, the first network tap comprising three bidirectional ports including:

an input port for receiving LAN side incoming network traffic, an output port for forwarding the incoming LAN side network traffic directly to the monitored network device as outgoing network traffic, and a monitoring port for forwarding a copy of the incoming LAN side network traffic and the outgoing network traffic to the first network monitor server, wherein the second network tap is configured to copy all of said incoming and outgoing network traffic data being communicated on said LAN side of said network device in said network in said coupled state, and wherein the first network monitor server is coupled in series and parallel with said monitored network device, the server being in operable communication with the first network tap and the second network tap, wherein said parallel coupling between the first network monitor server and said monitored network device comprises a first coupling means configured to couple the network monitor server directly to the monitored network device via the first network tap on said WAN side of the network device and a second coupling means configured to couple the network monitor server directly to the monitored network device via the second network tap on said LAN side of the network device.

11. The method of claim 10 further comprising the steps of:

computing an exiting packet hash based, at least in part, on an exiting packet payload;

computing an entering packet hash based, at least in part, on an entering packet payload;

comparing said exiting packet hash to said entering packet hash.

12. The method of claim 10 further comprising the steps of:

recording entering packets which are LAN side entering requests for data;

comparing one or more LAN side exiting packets to said LAN side entering requests for data;

detecting one or more LAN side exiting packets which do not have a corresponding said LAN side entering request for data.

13. The method of claim 10 further comprising the steps of:

receiving a known network traffic report corresponding to a host computer system, wherein said known network traffic report comprises information about all network traffic known to an operating system of said host computer system; and comparing packet header information from said known network traffic report to packet header information from said at least one of said entering packets and said exiting packets to determine packets which are not reported in said known network traffic report.

14. The method of claim 10 further comprising the step of:

comparing one or more entering packets collected at time T to one or more exiting packets collected within a time frame beginning at time T and ending at time T plus a delta time value.

15. The method of claim 14 further comprising the step of:

comparing at least one of source IP address, source port, destination IP address, and destination port of an exiting packet to corresponding header information of an entering packet.

16. The method of claim 15 further comprising the steps of:

computing an entering hash based on said entering packet, computing an exiting hash based on said exiting packet, comparing said entering hash to said exiting hash, determining that said exiting packet is a NAT-modified version of said entering packet based on comparison of said entering hash and said exiting hash.

17. The method of claim 16 further comprising the step of:

comparing payload size of said entering packet with payload size of said exiting packet.

18. The method of claim 17 further comprising the step of:

comparing at least one of TCP sequence number, TCP acknowledge number, and TCP checksum between said entering packet and said exiting packet.

* * * * *